Figure 1:
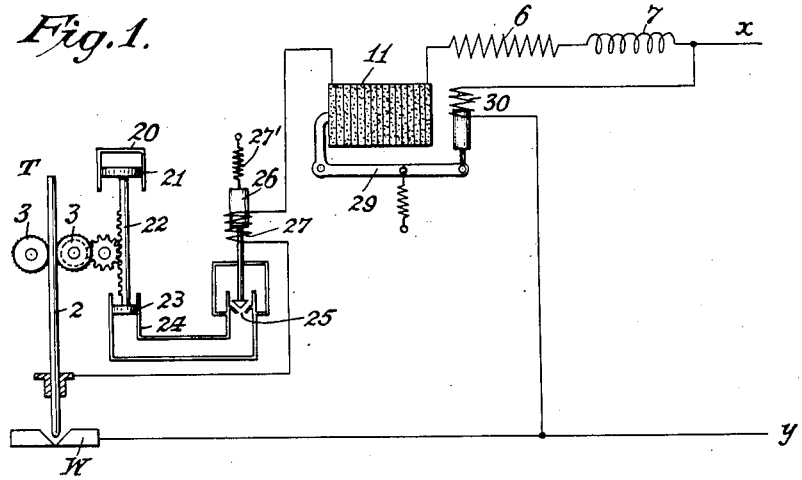

Nov. 8, 1927.  1,648,561

H. D. MORTON

APPARATUS FOR ARC WELDING

Filed Dec. 2, 1918   3 Sheets-Sheet 1

Inventor
Harry D. Morton
By his Attorneys
Gifford & Bull

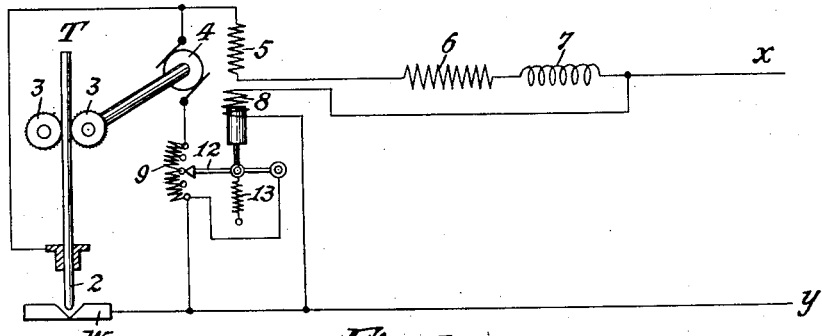
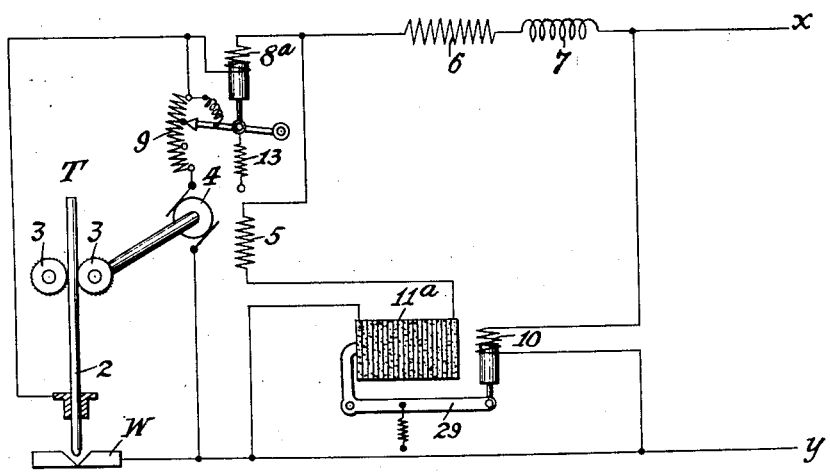
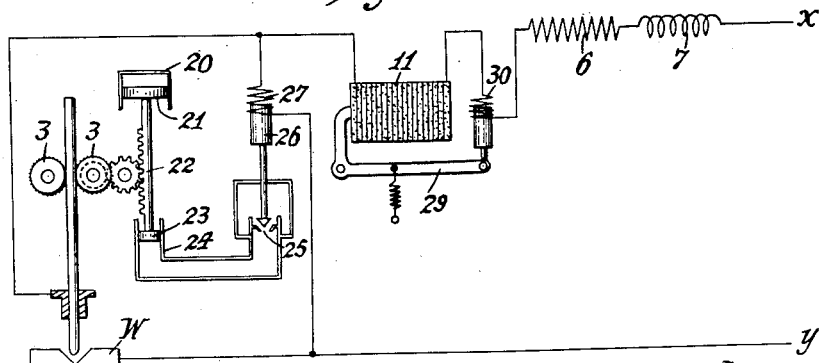

Nov. 8, 1927.  
H. D. MORTON  
1,648,561  
APPARATUS FOR ARC WELDING  
Filed Dec. 2, 1918  
3 Sheets-Sheet 3

Inventor  
Harry D. Morton  
By his Attorneys  
Gifford & Bull

Patented Nov. 8, 1927.

1,648,561

UNITED STATES PATENT OFFICE.

HARRY D. MORTON, OF NEW YORK, N. Y., ASSIGNOR TO AUTOMATIC ARC WELDING COMPANY, OF DETROIT, MICHIGAN, A CORPORATION OF MICHIGAN.

APPARATUS FOR ARC WELDING.

Application filed December 2, 1918. Serial No. 264,928.

My invention relates to metallic electrode arc welding apparatus and the method of operating the same, and particularly to the maintenance of the arc in automatic and semi-automatic machines.

In such welding apparatus as previously devised and used by me, a welding strip serving as an electrode is continuously fed to the work, and by its melting supplies metal to produce the weld. The difficulty in the operation of such a machine, is to maintain the correct relation between the fusing rate and the feeding rate of the welding strip. During the usual welding operation, in which the welding tool is moved over flat work, if the rate of fusion becomes too high, the arc will rupture; while if it is too low the welding strip will come into contact with the work. In general, therefore, it is desirable to have the feeding rate of the strip approximate the fusing rate thereof. It is to be understood, however, that it is not necessary under all conditions to maintain a perfectly uniform arc length, and, in fact, I contemplate varying the arc length somewhat in accordance with the requirements of various classes of work. Furthermore, when the contour of the work varies, it is necessary to vary the relation between the fusing rate and the feeding rate of the strip. For instance, if an elevation or protuberance in the work is encountered, it then becomes necessary to fuse the strip faster than it is fed. On the other hand, if a depression in the work is encountered, it becomes necessary to feed the strip faster than it is fused.

In my renewal application, Serial No. 186,238, filed August 14, 1917, I have described an automatic arc welding apparatus, wherein the continuous feed is varied in accordance with a varying characteristic of the arc to maintain the arc.

In this case a constant potential circuit is assumed, namely, a circuit maintaining a sufficient approximation to a constant potential to permit the described operation. When changes of potential beyond this limit are unavoidable, it is necessary to provide corrective means. There are thus two sorts of variations which tend to vary the relation between these two rates, and these causes in general have opposite effects, and require opposite corrective changes to compensate for their effects. These two causes may be defined respectively as causes internal to the arc, such, for example, as movement thereof, or variation in the character of the electrode materials, and causes external to the arc, such as varying voltage or resistance of the external circuit.

The following will illustrate what I mean in referring to the opposite character of these effects. If the circuit conditions are constant, an increase of current in the arc must result from internal changes, and in general indicates that the rate of feed is too great for the existing rate of fusion, and that the arc is, therefore, shortened. This, as I have shown in other applications, may be corrected by automatically decreasing the rate of feed of the electrode. If, however, the internal conditions of the arc remain constant but an external change occurs such as to increase the current flowing through the arc, this arbitrary increase of current will increase the fusing rate, and cause the arc to lengthen. While this action is in a measure self-compensatory, it is not sufficiently so if the external change is considerable and the difficulty would be corrected by increasing the rate of feed. Similarly, if with constant external conditions, a decrease of current occurs, such decrease denotes, in general, too slow a rate of feed for the existing rate of fusion, and may be corrected by an increased rate of feed. If, however, with constant internal conditions a decrease of current results from a decrease of the external applied voltage, its effect is to decrease the rate of fusion, and if sufficient will require a decreased rate of feed instead of an increase, to stably maintain the arc.

My invention consists in methods and means for causing these two sorts of variations to exert the required corrective effects to maintain the necessary relation between the fusing and feeding rates.

Figure 2:
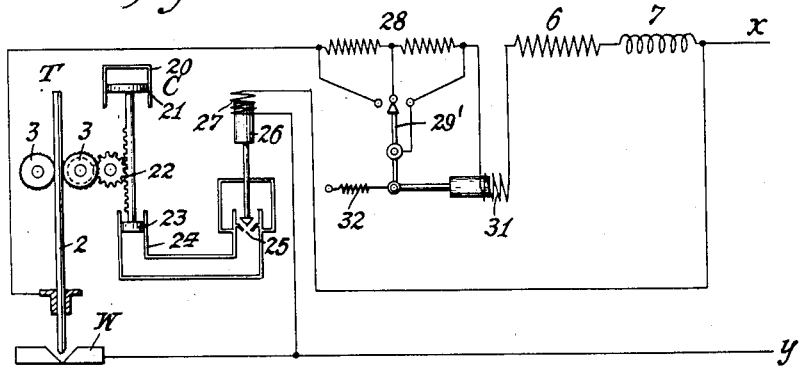
Figure 2A:
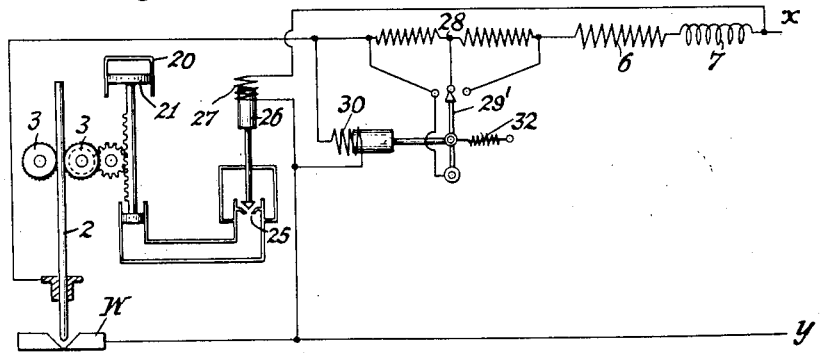
Figure 6:
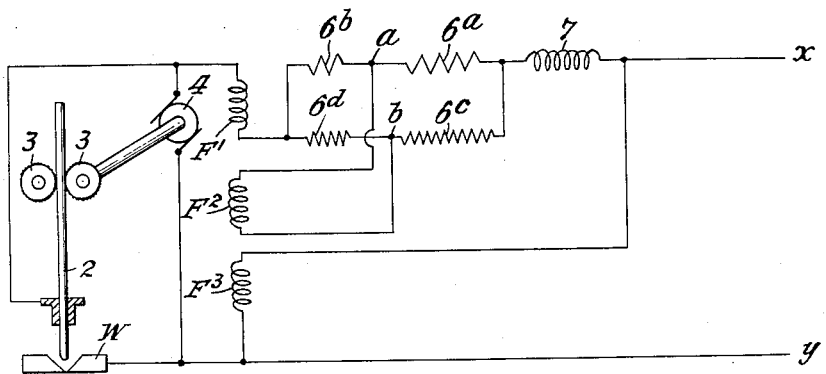
Figure 7:
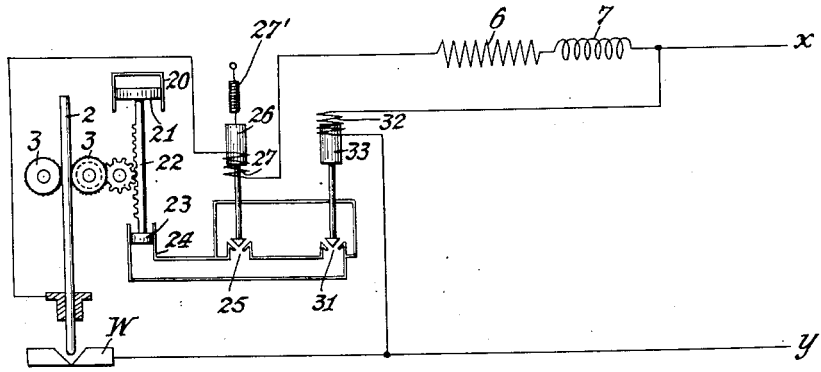

In Figure 1, I show diagrammatically an arrangement in which changes in the relation between fusing and feeding rates, due to internal causes, are corrected by varying the rate of feed, and changes due to external variations are corrected by varying the rate of fusion. In Figs. 2 and 2ª I have shown diagrammatically, arrangements wherein changes in the relation between the rate of fusion and the rate of feed due to internal conditions, are corrected by varying the rate of fusion, and changes in such relation due to external causes, are corrected by changing the rate of feed. In Fig. 3, I have shown diagrammatically, an arrangement wherein the changes in relation between the rate of fusion and the rate of feed due to internal causes are corrected by variation from a normal or base rate of feed in response to electrical changes internal to the arc, and changes in such relation due to external changes are corrected by altering this existing normal or base rate of feed in response to changes occurring external to the arc. In Fig. 4, I have shown diagrammatically, an arrangement wherein changes in the rate of fusion and the rate of feed, due to internal causes, are corrected by altering the normal or base rate of feed in response to electrical changes internal to the arc, and changes in the relation due to external changes are corrected by variations from the existing normal or base rate of feed in response to changes external to the arc. In Fig. 5, I have shown diagrammatically, an arrangement in which both causes of variation are taken care of by a current regulator in the circuit for maintaining constant arc current, and a means for varying the normal rate of feed to maintain the arc voltage constant. In Fig. 6, I have shown diagrammatically a modified arrangement responsive to variations in resistance in the external circuit, to variations in the impressed voltage, and to conditions in the arc for controlling the relation between the fusing rate and the feeding rate. In Fig. 7 I have shown diagrammatically an air-operated, oil-controlled feeding device which responds to both internal and external conditions.

In Fig. 1, I have shown an arrangement wherein internal variations are corrected by changing the rate of feed, while external variations are corrected by changing the rate of energy supplied to the arc by means of a magnet connected in shunt to the supply circuit controlling a resistance in series therewith. Machines for effecting this regulation for internal changes are more fully shown and described in my pending application Serial No. 186,238, filed August 14, 1917.

The supply wires $y$, $x$, are connected, respectively, to the work W, and, through resistance 6 and reactance 7, to the welding apparatus. The welding apparatus T is indicated, diagrammatically only, as comprising the feed wheels 3, driven by a compressed air motor having a cylinder 20, a piston 21, and a piston rod 22. The piston rod is provided with teeth forming a rack to drive the feeding mechanism typified by gears 3. The lower end of the piston rod 22 has an oil piston 23, working in cylinder 24, which is filled with oil. The escape of the oil is governed by valve 25, which, in turn is controlled by a magnet 27 acting upon a core 26 in opposition to a spring 27'. The spring normally tends to open the valve 25.

A series rheostat 11, controlled by an arm 29 and magnet 30, is also provided. This rheostat is shown as of the carbon disc type, but this particular form is not essential. The magnet 30 is connected in shunt to the circuit, and acts against the weight of the arm 29 to release pressure on the carbon pile rheostat 11, and so increase its resistance.

If external conditions remain constant but the internal conditions vary, the increase of current, indicating too high a feeding rate, and too short an arc, acting on magnet 27, would reduce the opening in the valve 25 and slow down the feed by restricting the escape of oil from the cylinder 24. An opposite cause would have an opposite effect. If external changes occur, such as a rise of voltage in the circuit $y$, $x$, the magnet 30 will act upon the control lever 29 to increase the resistance of rheostat 11. This rheostat and magnet are so proportioned as to correct for a rise or fall of circuit voltage by such a change of resistance that the change of voltage will not materially alter the current in the circuit.

In Fig. 2, I have shown an arrangement wherein the welding strip is normally fed at a constant rate determined by adjusting means responsive to a magnet connected in shunt to the circuit, and hence responds to variations due to external causes. The rate of fusion is controlled by a variable resistance in series with the circuit in response to a magnet also in series therewith, and hence responds to internal variations.

In Fig. 2 the welding apparatus T indicated diagrammatically is the same as that shown in Fig. 1. The supply wire $x$ leads through resistance 6, reactance 7, and variable rheostat 28 to the welding strip 2. In this instance the series coil 31 also connected in circuit with the wire $x$ controls the arm 29' of the variable rheostat 28, while the magnet 27, acting against the weight of its core 26, and movable part of valve 25, controls the rate of feed. So long as all conditions are constant, the welding strip will have a definite normal rate of feed determined by the position of the core 26 in response to the normal circuit voltage. If external conditions remain the same, but internal conditions vary, the resulting variation of current through the magnet 31 will vary the fusing current. Thus an increase of current indicating too short an arc and too slow a rate of fusion will be corrected by the magnet 31, which will decrease the amount of resistance in the circuit, thereby further increasing the current and hence the fusing rate. This will quickly restore the proper relation between the fusing rate and the feeding rate. Conversely, if the current decreases, indicating too long an arc and too rapid a rate of fusion, the magnet 31 will be weakened and the spring 32 will move the arm 29' to increase the resistance in the circuit, thereby restoring the proper relation between the rate of fusion and the rate of feed. The minimum amount of resistance in the circuit must, of course, always be sufficient for stabilizing purposes, that is, sufficient to overcome the negative characteristic of the arc.

If external conditions change, as, for example, by a rise of voltage, thus tending to produce a permanently increased rate of fusion, the magnet 27 acting upon the core 26 will open wider the valve 25, and thereby permit an increased normal rate of feed. Conversely, a decrease in circuit voltage will produce a reduced normal rate of speed.

Fig. 2ª is the same as Fig. 2 except that the rheostat 28 is controlled by magnet 30 connected in shunt to the arc. A rate of fusion greater than the rate of feed will result in a higher arc voltage, and the magnet 30 will act to increase the resistance in the circuit and reduce the fusing rate, while too small a rate of fusion will result in a reduced arc voltage, and the magnet 30 will act to increase the current and restore the correct relation between the rate of feed and the rate of fusion.

It will be observed that in both of these cases, namely, Figs. 2 and 2ª the rate of feed is constant so long as the external circuit conditions are constant, and the correction for internal variations is effected by exaggerating, so to speak, the natural corrective tendency of the arc itself.

In Fig. 3, y, x, indicate the supply wires connected, respectively, to the work W, and, through resistance 6 and reactance 7, to the welding apparatus T. The electrode 2 is fed by mechanism indicated diagrammatically only, as a pair of feed rolls 3, driven by an electric motor whose armature 4 is connected in shunt to the arc, and whose field magnet 5 is connected in series therewith. In series with the armature 4 is a rheostat 9, controlled by magnet 8, connected in shunt across the main circuit y, x. The mode of operation of the apparatus is as follows: If the external conditions are constant, the contact arm 12 of the rheostat remains in a fixed position, and will, under normal conditions, determine a constant normal rate of feed for the welding strip substantially equal to the rate of fusion for a given standard arc current and voltage. If now, due to some peculiarity of the material, or to other internal causes, the rate of fusion increases, the arc will lengthen, and the current through it decrease. This will result in weakening the field 5 of the motor, thereby increasing its speed until the increased speed equals the temporarily increased rate of fusion. Conversely, if, due to similar causes, the rate of fusion decreases, the arc will shorten, and its current increase, thereby strengthening the motor field and decreasing the rate of feed until it equals the temporarily decreased fusion rate. When the fusion rate in either case is restored to normal, the corresponding changes in current will restore the feeding rate to normal.

If now external variations occur, such, for example, as a rise of voltage, resulting in an increase of current, this increase of current will cause an increased rate of fusion necessitating an increase of speed. The increase of voltage, however, will strengthen the magnet 8, causing it to move the arm 12 to decrease the resistance 9 in the armature circuit, thereby determining a new standard or normal speed for the motor increased to correspond to the increased flow of current under the changed circuit conditions. Similarly, if the external change results in a decrease of current, this decreased current would correspond to a reduced rate of fusion. The magnet 8, in response to the reduced voltage, would be weakened, and the controlling spring 13 would act to insert resistance in the armature circuit, thereby fixing a reduced normal rate of speed corresponding to the reduced rate of fusion under then existing circuit conditions.

Since these means are independently actuated, they would exert independent effects, and correct for concurrent internal and external variations without mutual interference.

In Fig. 4 the arrangement is, in general, similar to that shown in Fig. 3, except for the mode of exciting the armature and field elements of the motor, respectively. In Fig. 4 the armature 4 and field magnet 5 are connected in shunt to the arc, the former through the rheostat 9, and the latter through the rheostat 11ª, and are hence responsive to variations in arc voltage. The rheostat 9 is controlled by magnet 8ª in series with the main circuit, and the rheostat 11ª is controlled by magnet 10 in shunt to the circuit y, x.

The mode of operation of the apparatus is as follows: So long as the rheostats 9 and 11ª are not altered, the speed of the motor will remain substantially constant notwithstanding variations in the arc voltage within operative limits. Should a rise of circuit voltage occur, resulting in an increased current, the magnet 10 will increase the resistance or rheostat 11ª, thereby weakening the field magnet of the motor, and increasing the rate of feed. Similarly, a decrease of voltage would increase the strength of the motor field, and decrease the rate of feed. Should the current in the circuit increase by a definite amount, magnet 8ª will move the arm of rheostat 9 to increase the resistance in the armature circuit by a definite amount. This will result in a definite decrease in the normal rate of feed. Thus current variations alter the normal speed by definitely altering the resistance of the armature circuit, while variations in circuit voltage proportionately vary the speed from normal. Since the rheostat $11^a$ is a carbon disc rheostat, and can be made responsive to minute fluctuations of voltage, while the rheostat 9 responds only to definitely determined increments of current, these two regulating means do not conflict, but the rate of feed is progressively varied to correspond to circuit variations, while the normal speed is adjusted from time to time to correspond to current variation.

In Fig. 5, I have shown an arrangement in which variations in current due to both causes are taken care of by a current regulator, arranged to maintain the current in the circuit constant by varying the external resistance in the circuit, and an arc voltage regulating means which maintains the arc voltage constant by varying the rate of feed. In Fig. 5 I have diagrammatically indicated the welding strip as fed by a compressed air motor through appropriate gearing, and controlled by a valve as in Figs. 1 and 2. Details of a welding machine having this type of motor are fully shown in my application Serial No. 264,927, filed of even date herewith. The arrangement of this valve 25 and magnet 27 is such that the valve tends to close under its own weight, and that of the magnet core 26, but is opened by the attraction of the magnet. When the normal arc voltage exists, the valve 25 is opened by magnet 27, by a definite amount, to establish a normal rate of feed. Should the arc voltage rise, the magnet is strengthened, and the valve further opened, permitting an increase in the rate of feed. Similarly, the reverse operation takes place if the arc voltage decreases. The resistance 11, shown as a carbon pile rheostat, is controlled by magnet 30 in such manner that the tendency of the current to rise, is corrected by an increase of resistance in the circuit, and a tendency of the current to fall is corrected by a decrease of resistance as will be apparent.

In Fig. 6, I have indicated diagrammatically a modified arrangement for controlling the relation between the fusing rate and the feeding rate of the welding strip, said means being responsive to variations in resistance in the external circuit, as well as to the variations in the impressed voltage—the means also being responsive to the internal conditions as in the previous figures. The welding strip 2 is fed between feed-rolls 3—3, constantly driven by the armature 4 of an electric motor. This motor is provided with three field windings, $F^1$, $F^2$ and $F^3$. The stabilizing resistance comprises four sections, $6^a$, $6^b$, $6^c$ and $6^d$, arranged Wheatstone bridge fashion, as shown. Resistance $6^a$ and $6^b$ carry the major portion of the current and $6^a$ constitutes the major portion of the resistance in that side of the bridge. It may be of any shape or convenient form, such as a cast-iron grid, iron wire, or water rheostat. Resistance $6^b$ is of a material whose resistance temperature coefficient approximates zero, as are also the resistances $6^c$ and $6^d$. The armature 4 of the motor is connected in shunt across the arc, and the field winding $F^1$ is in series with the arc. Field winding $F^2$ is connected between points $a$ and $b$ of the bridge circuit, the arrangement being such that at the normal operating temperature there is no voltage between the points $a$ and $b$, and hence no current in the winding $F^2$. The third field winding $F^3$ is connected across the line conductors $x$, $y$.

The operation of the arrangement shown in Fig. 6 is as follows: So long as the resistance $6^a$ is at normal temperature, and hence normal value, no current flows through the coil $F^2$ between points $a$ and $b$. Should the resistance of $6^a$ change, current will flow between points $a$ and $b$ and through the winding $F^2$. This winding is so connected that any increase in resistance $6^a$ will cause the current in $F^2$ to strengthen the motor field and decrease the rate of the feed; while a decrease in $6^a$ will have an opposite effect. In this manner the stabilizing resistance may change in value, but be constant in its stabilizing effect, and repeated changes in the adjustment of the tool will be obviated.

The field winding $F^3$ is wound differentially with respect to the field winding $F^1$, in order to cause the motor to respond to changes in impressed voltage on the conductors $x$, $y$ and to maintain the correct relation between the fusing rate and feeding rate of the strip. For example, if the voltage between the conductors $x$, $y$ rises above the normal value, there will be a tendency to increase the fusing energy at the arc and thus produce too long an arc. The increase in voltage between the conductors $x$, $y$ will increase the current in the field winding $F^3$, and as this is wound differentially with respect to the field winding $F^1$, the magnetic field will decrease and correspondingly increase the speed of the motor to compensate for the increase in fusing energy at the arc. A fall in voltage across the conductors $x$, $y$ will correspondingly reduce the speed of the motor.

In Fig. 7 I have shown an air-operated, oil-controlled feeding device which responds both to internal and external conditions. In the device there shown, the welding strip 2 is engaged by the rolls 3—3, as before, the feed-rolls 3 being operated by a piston 21 within a cylinder 20 connected to a piston rod 22 formed with a rack engaging an idlerpinion interposed between the rack and the feed roll 3. The lower end of the piston rod 22 is secured to a piston 23, disposed within oil cylinder 24, provided with outlet valves 25 and 31. The valve 25 is controlled by a winding 27 connected in series with the arc, which winding acts upon a core 26 connected to the valve, the core being normally lifted by spring 27'. The second valve 31 is controlled by a coil 32, which is connected in shunt across the conductors $x$, $y$, which coil acts upon a core 33 connected to the valve, the valve being normally closed by the weight of the core. The operation of the arrangement shown in Fig. 7 is as follows: The feeding mechanism is designed to maintain the correct relation between the fusing rate and the feeding rate of the strip with a normal current in the arc and normal voltage across the conductors $x$, $y$. Should the arc shorten, thereby increasing the current at the arc, the coil 27 will be more strongly energized, thereby constricting the valve opening 25 and causing a decrease in the feeding rate to restore the correct relation between the fusing rate and the feeding rate. A decrease in the current at the arc will be accompanied by a corresponding increase in the feeding rate of the strip. Any increase in voltage above normal across the conductors $x$, $y$, which would be accompanied by an increase in current at the arc, will attract the core 33 and further open the valve 31 and thereby increase the rate of feed of the strip 2. A decrease in voltage below normal across the conductors $x$, $y$ will be in a similar manner accompanied by a decrease in the feeding rate of the strip.

What I claim and desire to secure by Letters Patent of the United States is:—

1. In a metallic electrode arc welding apparatus, means for continuously feeding a welding strip toward the work, means responsive to variations internal to the arc, and means responsive to variations external to the arc, one of said means determining the normal rate of feed of the welding strip, and the other producing variations from the normal rate of feed to control the relation between the rate of fusion and the rate of feed.

2. In a metallic electrode arc welding apparatus, an electric motor, means whereby said motor continuously feeds a welding strip toward the work, and means responsive to variations both internal and external to the arc whereby one of said variations affects the field magnet, and the other affects the armature of said motor.

3. In an arc welding apparatus, a resistance member included in the welding circuit, means for continuously feeding the welding strip toward the work, and means responsive to variations in the resistance of said member and to internal conditions of the arc for controlling the relation between the fusing rate and the feeding rate of the strip.

4. In an arc welding apparatus, a resistance member included in the welding circuit, means for continuously feeding the welding strip toward the work, and means responsive both to the internal and external conditions of the arc and to changes in the resistance of said member for controlling the relation between the rate of fusion and the rate of feed of said strip.

5. In an arc welding apparatus, a resistance member included in the welding circuit, means for continuously feeding the welding strip toward the work, and means responsive both to the internal and external conditions of the arc and to changes in resistance of said member for varying the rate of feed of said strip.

6. In electric arc welding, the combination of a welding circuit including a plurality of electrodes between which an arc is adapted to be struck, means responsive to a variable characteristic of the welding circuit for controlling said arc, and means for modifying the action of said arc-control means, said modifying means being responsive to another variable characteristic of the welding circuit and being operative to compensate for changes in resistance in the welding circuit external to said arc.

7. In electric arc welding, the combination of a welding circuit including a plurality of electrodes between which an arc is adapted to be struck and means for maintaining said arc, said means comprising electrode-feeding means, arc-control means responsive to changes in arc length, and electro-responsive means co-operative with said arc-control means for compensating for changes in resistance in said welding circuit external to the arc.

8. In electric arc welding, the combination of a source of welding current, a circuit including said source and a plurality of electrodes between which an arc is adapted to be struck, and means for maintaining said arc comprising electrode-feeding means, arc-control means responsive to changes in arc length, and arc-control means co-operative with said first-named arc-control means and responsive to a characteristic of said source of welding current for compensating for changes in the voltage impressed upon said welding circuit.

9. In electric arc welding, the combination of a welding circuit including a source of electric energy and a plurality of electrodes between which an arc is adapted to be struck, and means for maintaining said arc comprising electrode-feeding means, arc-control means responsive to variations in arc length, and means governed by a characteristic of said source of electric energy for modifying the action of said arc control means in order to compensate for changes in the voltage impressed upon said welding circuit.

10. In electric arc welding, the combination of a source of electric energy, a welding circuit including said source and a plurality of electrodes between which an arc is adapted to be struck, electrode-feeding means, and means for maintaining said arc, said last-named means comprising arc-control means responsive to variations in arc length, electro-responsive means co-operative with said arc-control means for compensating for changes in voltage impressed upon the welding circuit, and electro-responsive means also co-operative with said arc-control means for compensating for changes in resistance in said circuit external to the arc.

11. In electric arc welding, a welding circuit including a source of electric energy and a plurality of electrodes between which an arc is adapted to be struck, and means for continuously maintaining said arc substantially constant in length, said means comprising electrode-feeding means, arc-control means responsive to a characteristic of said circuit, means co-operative with said arc-control means and responsive to another characteristic of the welding circuit for compensating for changes in the voltage impressed upon said circuit, and means also co-operative with said arc-control means and responsive to a third characteristic of the welding circuit for compensating for changes in resistance in the said circuit external to the arc.

12. In electric arc welding, a source of welding current, a circuit including said source and a plurality of electrodes between which an arc is adapted to be struck, means for maintaining said arc comprising electrode-feeding means, arc-control means governed by an arc characteristic, and means for modifying the action of said arc-control means comprising an electro-responsive device governed by a characteristic of said source and operative to compensate for changes in the voltage impressed upon the circuit, and an electro-responsive device governed by a characteristic of said circuit external to the arc and operative to compensate for changes in resistance in said circuit external to the arc.

In testimony whereof I have hereunto signed my name.

HARRY D. MORTON.